NONSEARCHING AUTOMATIC FREQUENCY CONTROL SYSTEM

Filed Aug. 11, 1960

INVENTORS
MARVIN D. AASEN
JOHN D. ALBRIGHT
BY
H. W. Loeb
ATTORNEYS

United States Patent Office 3,085,210

Patented Apr. 9, 1963

3,085,210
NONSEARCHING AUTOMATIC FREQUENCY CONTROL SYSTEM

Marvin D. Aasen, Severna Park, and John D. Albright, Beltsville, Md., assignors, by mesne assignments, to the United States of America as represented by the Secretary of the Navy Filed Aug. 11, 1960, Ser. No. 49,110
5 Claims. (Cl. 331—31)

This invention relates to automatic frequency control systems and more particularly to a nonsearching automatic frequency control system of the difference-frequency class having a second intermediate frequency sufficiently higher than the first intermediate frequency to produce a low ratio of bandwidth to center frequency.

The primary consideration of automatic frequency control (AFC) is the frequency stabilization of some source of radio frequency (RF) energy. Present day RF communication means having AFC systems are used with superheterodyne circuits in transmitters and receivers and operate by the control of the frequency of the local oscillator to produce an intermediate frequency (IF) in a mixer output of RF and local oscillator frequency which IF is applied through a conventional fixed-tuned IF amplifier and a discriminator to the local oscillator frequency control means. The AFC system of concern herein is of the difference-frequency class in which the difference between the received or transmitted frequency and the frequency of the local oscillator is to be maintained constant as an IF. Any deviation in this IF is detected in the discriminator circuit as an error voltage and applied through a control circuit to raise or lower the frequency of the local oscillator to correct the local oscillator frequency in a manner to bring the IF to the correct predetermined frequency level. AFC systems which have no frequency search feature are constructed in such a manner that any frequency derivation experienced by the transmitter or receiver (as tuned) will fall within the wide band IF amplifier and discriminator and the frequency will then "pull-in" or "lock-on." This method of locking onto the transmitter or receiver frequency results in several design problems, two important ones of which may be set out herein. One problem is to design an IF amplifier section to have a bandwidth large enough to respond to a wide band of frequency expected from the transmitter and still maintain good amplifier characteristics. Another problem is to design a discriminator where the quality factor (Q) can be maintained high with a resultant high gain control of the discriminator for the wide band frequencies expected in the AFC loop. While the AFC systems referred to herein may well apply to both transmitting and receiving systems, the description will more particularly refer to AFC systems used in transmitters, and particularly radar transmitters, although such references and examples given herein are not intended to limit the invention in any way.

In this invention the center frequency at which the AFC system operates is substantially increased to produce a small bandwidth-to-center-frequency ratio to eliminate the problems involved in wide bandwidth design of IF amplifier and discriminator circuits. In this invention a second mixer is included in the circuit of a nonsearching AFC loop between the first mixer and the IF stage. A reference oscillator, stabilized in frequency by a crystal means, is coupled to the second mixer to produce a second IF substantially higher than the first IF and the IF stage is designed for a center frequency matching the second IF. The discriminator is also designed for a crossover frequency matching this second IF. The problems encountered in designing an IF section and a discriminator circuit to accommodate the variations of transmitter signals has been eliminated since the ratio of bandwidth-to-center-frequency is now much smaller. The low quality factors (Q) encountered in the discriminator design are eliminated since the tuned circuit bandwidths are low with reference to their resonant frequencies resulting in higher discriminator gain and ease of design. It is therefore a general object of this invention to provide a nonsearching AFC system of the difference-frequency class having a sufficiently high centering or crossover frequency to establish a low bandwidth-to-center-frequency ratio.

These and other objects and the attendant advantages, features, and uses of the invention will become more apparent as the description proceeds when considered along with the drawing, in which.

Figure 1:
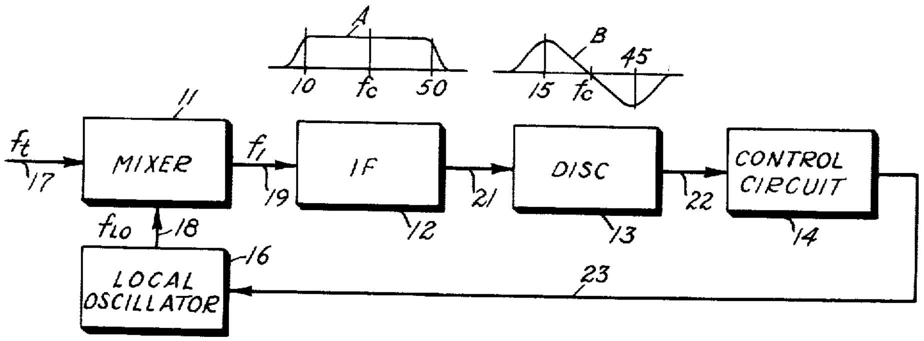
FIGURE 1 illustrates in block circuit diagram a conventional AFC loop.

Referring more particularly to FIGURE 1 there is shown a conventional AFC loop for superheterodyne transmitters. Although such AFC loops may be found in both transmitter and receiver systems, the description and examples given herein will be for transmitters although the invention is not limited to the AFC systems of transmitters. In this figure the AFC loop consists of a mixer 11, an IF amplifier section 12, a discriminator 13, a control circuit 14, and a local oscillator 16. Signal frequency from a transmitter, for example is applied to the mixer 11 by way of a conductor means 17 and heat frequency from the local oscillator 16 is applied by way of conductor means 18 to the mixer 11. The transmitter signal frequency is indicated herein by the reference character $f_t$ and the local oscillator frequency is represented herein by the reference character $f_{LO}$. The mixer 11 produces a difference frequency $f_1$, or first IF, which is applied by way of conductor means 19 to the IF section 12. The IF amplifier is usually designed to respond to the widest bandwidth possible under present engineering techniques. For example, where the AFC loop is designed for an IF of 30 megacycles the IF amplifier is designed for a center frequency $f_c$ of 30 megacycles. This IF amplifier section may have a bandwidth of from 10 to 50 megacycles as shown by the wavefrom A above the IF block 12. This 40 megacycle bandwidth is considered very wide for IF amplifier design and is difficult to achieve and still maintain good IF amplifier characteristics. The amplified IF is applied to discriminator circuit 13 by way of conductor means 21 which discriminator circuit will produce positive or negative direct current (D.C.) voltages for any errors that may exist in the IF from its predetermined frequency, given herein for an example as 30 megacycles. The error voltage, the polarity of which depends on whether the IF signal is above or below the predetermined IF, is conducted by way of conductor means 22 to the control circuit 14. The discriminator 13 is designed to have a center frequency, $f_c$, equal to the predetermined IF or 30 megacycles given as an example herein. As is well understood in the art, discriminators consist of a pair of tuning circuits staggered above and below the center frequency. An example of a typical discriminator bandwidth is shown herein by the waveform B above the block 13 as being from 15 megacycles to 45 megacycles or a bandwidth of 30 megacycles. Any deviation of $f_1$ from the predetermined IF of 30 megacycles above or below 15 or 45 megacycles respectively should "pull-in" or "lock-on" for automatic frequency control. Any deviation in the IF shown as $f_1$ herein will "pull-in" or "lock-on" and produce a direct current voltage on the output 22 of the discriminator 13 of a polarity determined by the amount that the IF is above or below the predetermined IF of 30 megacycles to control the frequency, $f_{LO}$, of the local oscillator 16 to the mixer 11. The error voltages from the discriminator 13 are sometimes so small that amplification is necessary to correct a local oscillator. The control circuit 14 ordinarily consists of an amplifier with a biased output which bias is equal to the reflector or repeller bias of the local oscillator to produce the predetermined IF or 30 megacycles at the output of the mixer 11. The control circuit 14 is coupled to the reflector or repeller of the local oscillator 16 by way of conductor means 23. Any deviation above or below the output bias of the control circuit 14 will raise or lower the oscillation $f_{LO}$ of the local oscillator to eliminate the IF error in $f_1$ to maintain proper IF for the transmitting system. The higher frequencies used in the transmitters of modern communication systems, such as radar, make it extremely difficult to design IF amplifier sections and discriminator circuits of sufficient bandwidth with good operating characteristics. To accommodate the transmitter frequency $f_t$ variations the bandwidth of the IF section must be very wide. The design of an IF section of wide band and reasonable gain involves the use of distributed amplifier. This type of design is difficult and perhaps somewhat elaborate for an AFC circuit. The discriminator is very wide with the tuned circuits having very low quality factors (Q) as a result of the relative center frequencies and bandwidths.

Figure 2:
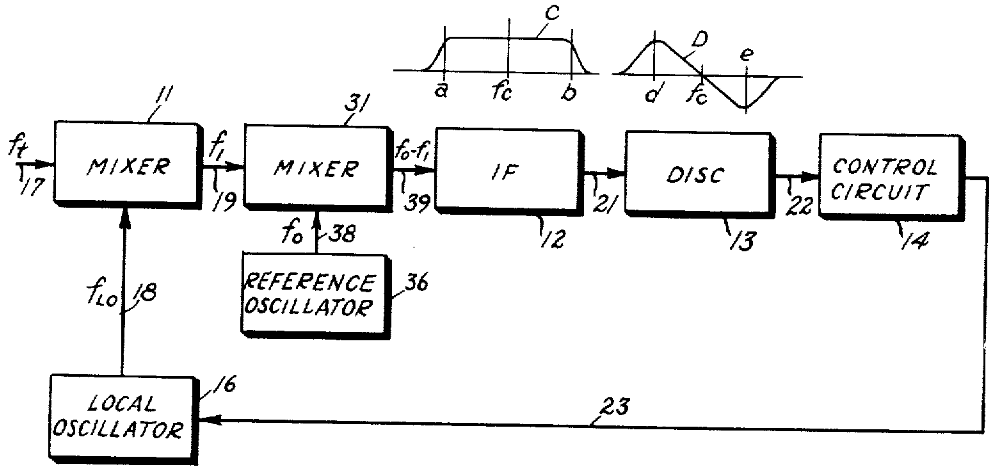
FIGURE 2 illustrates in block circuit diagram a nonsearching AFC loop for producing an increased center frequency or crossover frequency having a low bandwidth to center frequency ratio.

The present invention improves operation in AFC systems since better IF amplifier sections and discriminator circuits can be designed without the interference of the above bandwidth limitations. FIGURE 2 shows an AFC loop incorporating the present invention with like reference characters being applied to like elements and components of those in FIGURE 1. In FIGURE 2 a second mixer 31 is coupled between the first mixer 11 and the IF section 12 as shown. A reference oscillator 36 is coupled by way of the coupling means 38 to the second mixer 31 to apply the reference frequency $f_0$ thereto. The reference oscillator 36 may be of the crystal controlled type to produce a very stable and fixed frequency $f_0$. The reference oscillator 36 also may be of a type to produce low frequency in conjunction with frequency multipliers to produce the desired high frequency $f_0$ applied to the mixer 31. For the purpose of example, let it again be assumed that the local oscillator 16 frequency $f_{LO}$, and the frequency from the transmitter $f_t$ are such to produce an IF, $f_1$, of 30 megacycles on the mixer 11 output 19 to the mixer 31. For the purpose of example in describing this invention, let it further be assumed that the reference oscillator 36 produces a stable reference frequency $f_0$ of 120 megacycles applied to the mixer 31 by way of conductor means 38. The mixer 31 will then produce a second IF, or the difference of $f_0 - f_1$, on the output 39 to the IF amplifier 12. The difference frequency $f_0 - f_1$ or second IF will, in this example, be 90 megacycles and the IF section 12 will be designed for a center frequency $f_c$ or 90 megacycles. Likewise, the discriminator circuit 13 will be designed for a crossover frequency $f_c$ of 90 megacycles. If the IF amplifier section 12 is designed with a bandwidth of 40 megacycles, this bandwidth of *ab* in the waveform C shown above the block 12 will have *a* equal to 70 megacycles and *b* equal to 110 megacycles. In like manner, as the discriminator circuit 13 is designed for a bandwidth of 30 megacycles, *b* will equal 75 megacycles and *e* will be equal to 105 megacycles. The ratio of bandwidth to center frequency of the IF section 12 in FIGURE 2 is .44 while this ratio in the IF section 12 in FIGURE 1 is 1.33. Similarly, the bandwidth-to-center-frequency ratio of the discriminator circuit 13 of FIGURE 2 is one-third while that in FIGURE 1 is one. This eliminates the problem encountered in designing an IF amplifier section to accommodate the variations of transmitter signals in prior known devices since the ratio of bandwidth-to-center-frequency is much smaller. The low quality factors (Q) encountered in discriminator design are also eliminated since the two circuit bandwidths are low with reference to their resonant frequencies resulting in a higher discriminator gain. While it may be realized that additional error will be introduced in the AFC loop due to the addition of the reference oscillator, these errors should be negligible since the stability of the crystal controlled reference oscillator 36 can be designed to be quite good. With the addition of the mixer and reference oscillator elements 31 and 36 to the AFC loop to increase the center frequency at which the AFC loop operates, AFC loops may be designed with improved bandwidth characteristics and frequency control.

While many modifications and changes may be made in the constructional details and features of this invention by using different types of mixers and oscillators to accomplish the result of increasing the center frequency or crossover frequency of IF amplifier stages and discriminator circuits, it is to be understood that the illustrations shown and described and the examples given should in no way limit applicants' invention whereupon applicants desire to be limited only by the scope of the appended claims.

We claim:

1. An improved automatic frequency control loop in superheterodyne electromagnetic wave communication systems including a first mixer stage and an intermediate frequency amplifier stage therein operating to maintain the first mixer stage output intermediate frequency constant, the invention which comprises: a second mixer stage coupled between said first mixer stage and said intermediate frequency amplifier stage; and a reference oscillator coupled to said second mixer stage for mixing the constant intermediate frequency output of said first mixer stage and said reference oscillator output to produce a constant second intermediate frequency higher than said intermediate frequency of said first mixer stage, said reference oscillator output frequency being sufficiently high to provide a low ratio of bandwidth to center frequency of said intermediate frequency amplifier stage, and the center frequency of said intermediate frequency amplifier stage is equal to said second intermediate frequency.

2. An automatic frequency control system to obtain a small bandwidth to center frequency ratio comprising: a first mixer adapted to receive voltages of two frequencies and mix same to produce a first intermediate frequency; a second mixer coupled to said first mixer to receive said first intermediate frequency; a reference oscillator, for producing a frequency of oscillations exceeding by more than twice the first intermediate frequency, coupled to said second mixer to produce a second intermediate frequency at the output of said second mixer more than twice said first intermediate frequency; an intermediate frequency amplifier component having a center frequency equal to said second intermediate frequency coupled to receive the second mixer output; and a discriminator and control circuit coupled to the output of said intermediate frequency amplifier having an output control voltage coupled to control one of said two frequencies to maintain said first intermediate frequency constant whereby the ratio of bandwidth-to-center-frequency of said second intermediate frequency in said intermediate frequency amplifier component and said discriminator circuit is small.

3. An automatic frequency control circuit as set forth in claim 2 wherein said one of said two frequencies is produced by a local oscillator and said control voltage controls the local oscillator biasing means to control the generated frequency.

4. An improved automatic frequency control loop in superheterodyne electromagnetic wave communication systems including a first mixer, an intermediate frequency amplifier means, a discriminator, a control circuit, and a local oscillator, coupled in that order in the loop operating to control local oscillator oscillations to maintain a constant first intermediate frequency on the output of said first mixer, the invention which comprises: a second mixer coupled in the loop between said first mixer and said intermediate frequency amplifier means; and a reference oscillator of constant frequency coupled to said second mixer mixing said constant frequency with said first intermediate frequency producing a second intermediate frequency, said constant frequency being more than double said first intermediate frequency, said intermediate frequency amplifier having a center frequency equal to said second intermediate frequency, and said discriminator having a crossover frequency equal to said second intermediate frequency whereby the ratio of frequency bandwidth to the center frequency and crossover frequency of said intermediate frequency amplifier means and discriminator, respectively, is small relative to the ratio of said amplifier and discriminator frequency bandwidth to said first intermediate frequency.

5. An improved automatic frequency control loop as set forth in claim 4 wherein said first mixer is a crystal mixer and said second mixer is a vacuum tube mixer.

References Cited in the file of this patent

UNITED STATES PATENTS

| | | |
|---|---|---|
| 2,550,519 | Bataille | Apr. 24, 1951 |
| 2,921,271 | Collins | Jan. 12, 1960 |

UNITED STATES PATENT OFFICE

CERTIFICATE OF CORRECTION

Patent No. 3,085,210 April 9, 1963

Marvin D. Aasen et al.

It is hereby certified that error appears in the above numbered patent requiring correction and that the said Letters Patent should read as corrected below.

Column 2, line 32, for "heat" read -- beat --; line 46, for "wavefrom" read -- waveform --; column 3, line 67, for "b", in italics, read -- d --, in italics.

Signed and sealed this 22nd day of October 1963.

(SEAL)
Attest:

ERNEST W. SWIDER
Attesting Officer

EDWIN L. REYNOLDS
Acting Commissioner of Patents